(12) United States Patent
Ozturk et al.

(10) Patent No.: US 11,953,976 B2
(45) Date of Patent: *Apr. 9, 2024

(54) DETECTING AND RECOVERING FROM FATAL STORAGE ERRORS

(71) Applicant: Microsoft Technology Licensing, LLC, Redmond, WA (US)

(72) Inventors: Ayberk Ozturk, Irvine, CA (US); Scott Chao-Chueh Lee, Bellevue, WA (US); Brennan Alexander Watt, San Clemente, CA (US); Vishal Jose Mannanal, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/319,354

(22) Filed: May 17, 2023

(65) Prior Publication Data

US 2023/0289249 A1    Sep. 14, 2023

Related U.S. Application Data

(63) Continuation of application No. 17/532,651, filed on Nov. 22, 2021, now Pat. No. 11,687,395, which is a continuation of application No. 16/687,218, filed on Nov. 18, 2019, now Pat. No. 11,182,232.

(51) Int. Cl.
*G06F 11/07* (2006.01)
*G06F 11/14* (2006.01)

(52) U.S. Cl.
CPC ...... *G06F 11/0772* (2013.01); *G06F 11/0745* (2013.01); *G06F 11/1441* (2013.01); *G06F 11/1471* (2013.01)

(58) Field of Classification Search
CPC ............. G06F 11/0772; G06F 11/0745; G06F 11/1441; G06F 11/1471
See application file for complete search history.

(56) References Cited

U.S. PATENT DOCUMENTS 6,883,126 B1 * 4/2005 Herman ................. G11B 20/18
714/769
7,949,904 B2 * 5/2011 Ritz ..................... G06F 11/0706
714/48

(Continued)

*Primary Examiner* — Joseph R Kudirka
(74) *Attorney, Agent, or Firm* — Ray Quinney & Nebeker; James Bullough

(57) ABSTRACT

The present disclosure relates to systems, methods, and computer readable media for identifying and responding to a panic condition on a storage system on a computing node. For example, systems disclosed herein may include establishing recovery instructions between a host system and a storage system in responding to a future instance of a panic condition. The storage system may provide an indication of a self-detected panic condition in a variety of ways. In response to identifying the panic condition, the host system may perform one or more recovery actions in accordance with recovery instructions accessible to the host system. This may include performing resets of specific components and reinitializing communication between the host system and storage system in less invasive ways than slower and more expensive conventional approaches for responding to panic conditions on computing nodes.

20 Claims, 8 Drawing Sheets

(56) References Cited

U.S. PATENT DOCUMENTS

2006/0236035 A1* 10/2006 Barlow ................. G11C 29/76
    714/E11.004
2017/0344438 A1* 11/2017 Bilgiday ................ G06F 11/26
2019/0073268 A1* 3/2019 Kantor ................ G06F 11/3636

* cited by examiner

DETECTING AND RECOVERING FROM FATAL STORAGE ERRORS

CROSS-REFERENCE TO RELATED APPLICATIONS

This application is a continuation of U.S. application Ser. No. 17/532,651 filed Nov. 11, 2021, which is a continuation of U.S. application Ser. No. 16/687,218 filed Nov. 18, 2019, now U.S. Pat. No. 11,182,232, the entireties of which is incorporated herein by reference.

BACKGROUND

A cloud computing system refers to a collection of computing devices capable of providing remote services and resources. For example, modern cloud computing infrastructures often include a collection of physical server devices organized in a hierarchical structure including computing zones, virtual local area networks (VLANs), racks, fault domains, etc. These cloud computing infrastructure may provide computing resources to users including a variety of processors, memory, and storage devices capable of providing different services to users of the cloud computing system.

As computing systems continue to grow in popularity and complexity, a wide variety of hardware and/or software problems may arise. For example, many storage devices (e.g., solid-state drive (SSD) systems) encounter failure conditions (e.g., device panic, firmware asserts) that prevent the storage devices and associated host systems from operating effectively and providing services to clients. Indeed, as programs and applications become more complex, there are now hundreds of different failure conditions that may apply in preventing hardware and/or software on the cloud from providing reliable computing and storage resources to users of the cloud computing system.

Moreover, conventional approaches for detecting and fixing various failure conditions are often expensive, time-consuming, and otherwise inadequate at addressing the wide variety of possible failure conditions. For example, many solutions involve power cycling devices or clusters of multiple devices using a time-consuming and invasive process. Some solutions may involve mistakenly saving or perpetuating corrupted data resulting in future device failure conditions. Many solutions involve simply discarding or physically shredding hardware to be replaced by new hardware, even where the old hardware may be operational given a specific fix.

These and other problems exist with regard to detecting and recovering from various device panic conditions on a cloud computing system.

DETAILED DESCRIPTION

Figure 1:
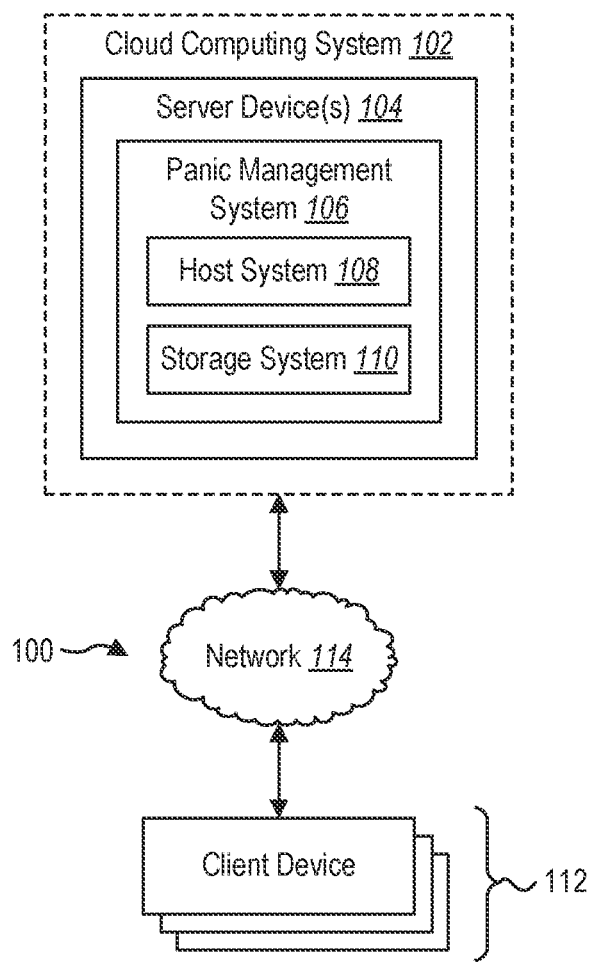
FIG. 1 illustrates an example environment of a network including a panic management system in accordance with one or more embodiments.

The present disclosure is generally related to detecting a panic condition on a storage system (e.g. an SSD storage device) and recovering from the panic condition to resume normal operation of the storage system. In particular, the present disclosure implements a standard approach to detecting a variety of different panic conditions on different types of storage hardware. The present disclosure further implements a non-invasive approach to performing one or more corrective actions to recover from a detected panic condition to facilitate a normal operational state between a host system and the storage system. Indeed, features and functionalities described herein enable a host system and storage system to cooperatively detect and recover from a variety of panic conditions using a variety of non-invasive approaches.

For example, as will be discussed in more detail herein, a storage system and host system can establish recovery instructions that enable the host system and storage system to cooperatively perform recovery actions in response to detecting a panic condition. As will be discussed in further detail below, upon detecting a panic condition (e.g., a firmware assert) preventing the storage system from operating correctly, the storage system can perform a series of acts (e.g., resetting a computer processing unit (CPU), storing debug info, flushing data to non-volatile storage) to prevent inadvertent interference or corruption of data and reestablish communication with the host system in accordance with an identified set of recovery instructions.

Moreover, and as will be discussed in more detail herein, a host system may access recovery instructions (e.g., log data) associated with recovering from a panic condition. The host system may identify a panic condition in a variety of ways (e.g., by reading a panic bit set by the storage system or based on a command timeout). In response to identifying the panic condition, the host system may wait for a predetermined period of time in accordance with the recovery instructions. After waiting for the predetermined period of time and allowing the storage system to prepare for various recovery actions, the host system may perform one or more recovery actions and re-establish normal operation between the host system and storage system.

As will be discussed in further detail below, the present disclosure includes a number of practical applications having features described herein that provide benefits and/or solve problems associated with detecting and recovering from a variety of panic conditions. In particular, one or more embodiments described herein involve a panic management system having features and functionality that enable a host system and storage system to cooperatively identify a variety of panic conditions in a less invasive and less expensive way than conventional systems. In addition, the panic management system may provide features and functionality that improve a likelihood that the host system and storage system can recover from the panic condition and resume normal operation without involving a more invasive recovery process.

For example, by establishing one or more trigger conditions associated with panic failure, a panic management system may enable a host system to determine that a panic condition has occurred without inadvertently interfering with or issuing additional commands to the storage system that the storage system is unable to process. In particular, as a result of conventional systems not providing a clear indication of when or how a storage system has failed, conventional systems often continue issuing input/output (I/O) commands to the storage system even where the storage system is unable to respond. Moreover, where the host system is not informed of the panic condition, the host system may not have any information to facilitate performing a variety of recovery actions.

In addition, by informing a host system as to when a panic condition has occurred (or enabling the host system to discover a panic condition without receiving a panic communication from the storage system) as well as providing recovery instructions, the panic management system can avoid performing overly invasive or potentially damaging recovery actions. In particular, by informing the host system of the panic condition and associated recovery instructions, one or more embodiments described herein can avoid problems of conventional recovery systems in which debug data is inadvertently lost or where invasive and time-consuming recovery procedures such as power cycling are performed unnecessarily.

In addition, by providing timely and relevant information to the host system (e.g., prior to experiencing device panic), the panic management system enables a host system and storage system to take specific actions to enable storage systems from a variety of vendors and manufacturers to recover from various panic conditions. Indeed, where conventional systems often involve a host system simply sending out an error report and a request that individuals (e.g., vendors) come out and investigate why a device has experienced a panic condition, one or more embodiments described herein may avoid sending out potentially unnecessary error reports that may have simple or common fixes.

In addition to identifying less invasive and more automated approaches to detecting and recovering from various panic conditions, one or more embodiments described herein may additional save significant costs associated with prematurely disposing of or replacing hardware on a cloud computing system. For example, where many conventional systems that are unable to diagnose or recover from panic conditions resolve the problem by simply replacing hardware with new hardware, this can become unnecessarily expensive where a panic condition could be resolved through a less invasive set of actions. Thus, one or more embodiments described herein may significantly save on costs associated with physically destroying and/or replacing hardware by enabling a host system to cooperatively resolve various panic conditions with a storage system.

As illustrated in the foregoing discussion, the present disclosure utilizes a variety of terms to describe features and advantages of the systems described herein. Additional detail is now provided regarding the meaning of such terms. For example, as used herein, a "cloud computing system" refers to a network of connected computing devices (e.g., computing nodes, server devices) that provide a variety of services to users of the cloud computing system (e.g., via client devices of the users). For example, as mentioned above, a cloud computing system may refer to a distributed computing system having a collection of physical server devices organized in a hierarchical structure including clusters, computing zones, virtual local area networks (VLANs), racks, fault domains, etc. As used herein, a "computing node" or "server device" may refer to any computing device or node including one or multiple device(s) of a cloud computing system. The cloud computing system may refer to a private or public cloud computing system.

In one or more embodiments, a computing node (or server device) includes a host system and a storage system. As used herein, "a host system" may include a combination of processing hardware (e.g., CPUs), memory of the computing node, or other mid to high level processing devices (e.g., devices having higher access speeds and/or instruction executing capacity). In one or more embodiments described herein, a host system includes a storage driver capable of interacting with and executing instructions in connection with a storage system. A storage system may include an SSD storage (or other non-volatile storage system) having non-volatile storage devices. In one or more embodiments described herein, the storage system includes a portion of volatile storage (e.g., a CPU, SRAM hardware, DRAM hardware) and a portion of non-volatile storage (e.g., NAND or flash storage). While one or more embodiments described herein relate specifically to an SSD storage, features and functionality in connection with identifying a panic condition on the SSD storage and recovering from the panic condition may similarly apply to other types of storage on cloud computing devices.

As used herein, a "panic condition" may refer to any condition of the storage system in which the storage system does not operate as predicted or as configured. For example, a panic condition may refer to a scenario in which a storage system enters a fatal state and does not know how to recover (e.g., without host intervention). An example of a panic condition may refer to a firmware assert in which a path of code encounters a state that prevents a processor from moving forward. For instance, as a result of a piece of data becoming compromised (or other potential issue), an SSD may assert a condition that is untrue and may enter a panic condition based on the asserted condition being untrue. A variety of panic conditions may apply in one or more embodiments described herein. Indeed, many SSDs have hundreds of assert conditions that may apply in a variety of circumstances.

Additional detail will now be provided regarding detecting and recovering from a panic condition of a storage system on a cloud computing system in relation to illustrative figures portraying example implementations. For example, FIG. 1 illustrates an example environment 100 including a cloud computing system 102 that provides a variety of services to users of the cloud computing system 102. As shown in FIG. 1, the cloud computing system 102 includes one or more server device(s) 104 (e.g., computing nodes) having hardware and/or software components for providing features and functionality described herein. In the example shown in FIG. 1, the server device(s) 104 may include a panic management system 106. The panic management system 106 may include the host system 108 and storage system 110.

In one or more embodiments, the panic management system 106 may be implemented on the host system 108 and/or storage system 110. For example, different features and functionality discussed herein of the panic management system 106 may be implemented wholly or partially on the host system 108 or the storage system 110. Nevertheless, for simplicity in describing one or more embodiments herein, the panic management system 106 may refer collectively to the host system 108 and the storage system 110 of the server device(s) 104.

As mentioned above, the host system 108 may refer to a combination of processing hardware, memory, and other mid to high level processing components of the server device(s) 104. As further mentioned, the host system 108 may include a storage driver at a lowest level of processing on the host system 108. In addition, the storage system 110 may include a variety of storage devices. For example, the storage system 110 may include SSD storage, HDD storage, or a combination of different types of storage devices. While connected to a power source powering the server device(s) 104, the host system 108 may read data from the storage system 110 and/or write data to the storage system 110.

The host system 108 may include a combination of processing hardware (e.g., CPUs), memory of the server device(s) 104, or other mid to high level processing devices (e.g., devices having higher access speeds and/or instruction executing capacity). In one or more embodiments described herein, a host system 108 includes a storage driver capable of interacting with and executing instructions in connection with a storage system 110.

As further shown, the environment 100 may include a plurality of client devices 112 in communication with the cloud computing system 102 (e.g., in communication with one or more server device(s) 104 and/or virtual machines hosted thereon via a network 114). The client devices 112 may refer to various types of client devices. For instance, a client device may refer to a mobile device such as a mobile telephone, a smart phone, a personal digital assistant (PDA), a tablet, a laptop, or wearable computing device (e.g., a headset or smartwatch). A client device may also refer to a non-mobile device such as a desktop computer, a server node (e.g., from another cloud computing system), or other non-portable device. The client devices 112 and/or the server device(s) 104 may include additional features and functionality as generally discussed below in connection with FIG. 7.

The network 114 may include one or multiple networks that use one or more communication platforms or technologies for transmitting data. For example, the network 114 may include the Internet or other data link that enables transport of electronic data between respective client devices 112 and components (e.g., server device(s) 104 and/or virtual machines thereon) of the cloud computing system 102.

As mentioned above, and as will be discussed in further detail below, the panic management system 106 may enable the host system 108 and storage system 110 to cooperatively identify a panic condition and perform recovery actions that enable the storage system 110 to recover from the identified panic condition. In one or more embodiments, the panic management system 106 establishes a contract and associated instructions between the host system 108 and storage system 110 to carry out features and functionally described herein.

For example, and as will be discussed in further detail below, the panic management system 106 can establish a recovery procedure or system contract that enables the host system 108 and storage system 110 to autonomously detect a panic condition and respond to the panic condition in accordance with one or more embodiments described herein. For instance, the host system 108 can access recovery instructions (or an indication of recovery instructions) that indicate conditions under which the host system 108 may accurately identify that a panic condition has occurred. As will be discussed in further detail below, the recovery instructions may be included within a log page accessible to the host system 108 upon startup of the server device(s) 104.

In addition, the recovery instructions may include instructions for both the host system 108 and storage system 110 that enables the storage system to prepare for recovery while preventing the host system 108 from inadvertently interrupting one or more actions by the storage system 110 and potentially interfering with a successful recovery from the panic condition. Moreover, the recovery instructions may include an identification of specific steps that the host system 108 and storage system 110 may perform in reestablishing communication between the respective systems 108-110 as well resuming normal operation of the server device(s) 104.

Figure 2:
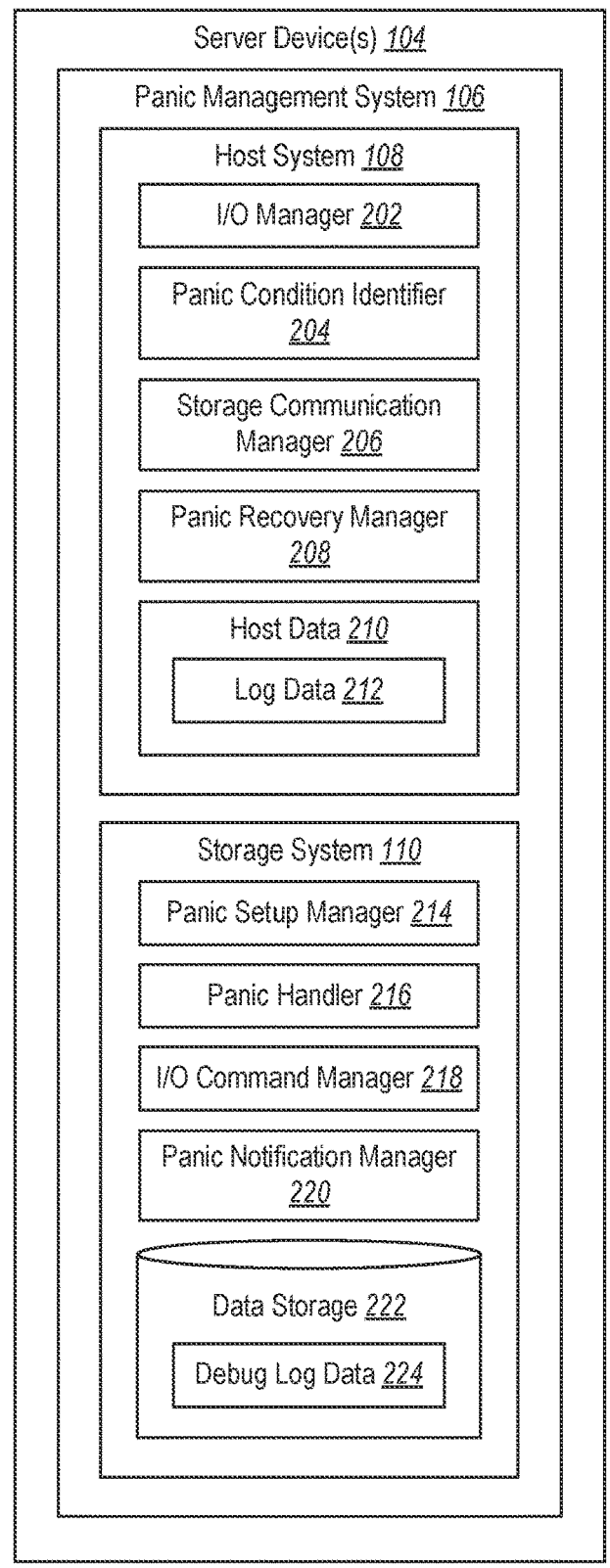
FIG. 2 illustrates an example server device having a panic management system implemented thereon in accordance with one or more embodiments.

Additional detail in connection with a panic management system 106 will now be discussed in connection with FIG. 2. In particular, FIG. 2 illustrates an example of the server device(s) 104 shown in FIG. 1 including the panic management system 106. As further shown, the panic management system 106 includes a host system 108 and a storage system 110. The host system 108 may include processing devices, memory devices, and a device driver. The storage system 110 may include a combination of volatile storage (e.g., a CPU, DRAM, SRAM) and non-volatile storage (e.g., NAND, Flash).

As shown in FIG. 2, the host system 108 and storage system 110 may include a number of components that enable the host system 108 and storage system 110 to cooperatively identify a panic condition and perform one or more recovery actions to enable the storage system 110 to recover from the panic condition. For example, as shown in FIG. 2, the host system 108 may include an I/O manager 202, a panic condition identifier 204, a storage communication manager 206, and a panic recovery manager 208. The host system 108 may also include (or have access to) a data storage 210 having log data 212 stored thereon. As further shown in FIG. 2, the storage system 110 may include a panic setup manager 214, a panic handler 216, an I/O command manager 218, and a panic notification manager 220. The storage system 110 may additional include a data storage 222 having debug log data 224 (and other data) stored thereon.

Components 202-224 illustrated in FIG. 2 are provided by way of example for illustrative purposes in describing one or more example implementations of the panic management system 106 herein. One or more implementations of the panic management system 106 may include fewer or additional components.

Figure 3:
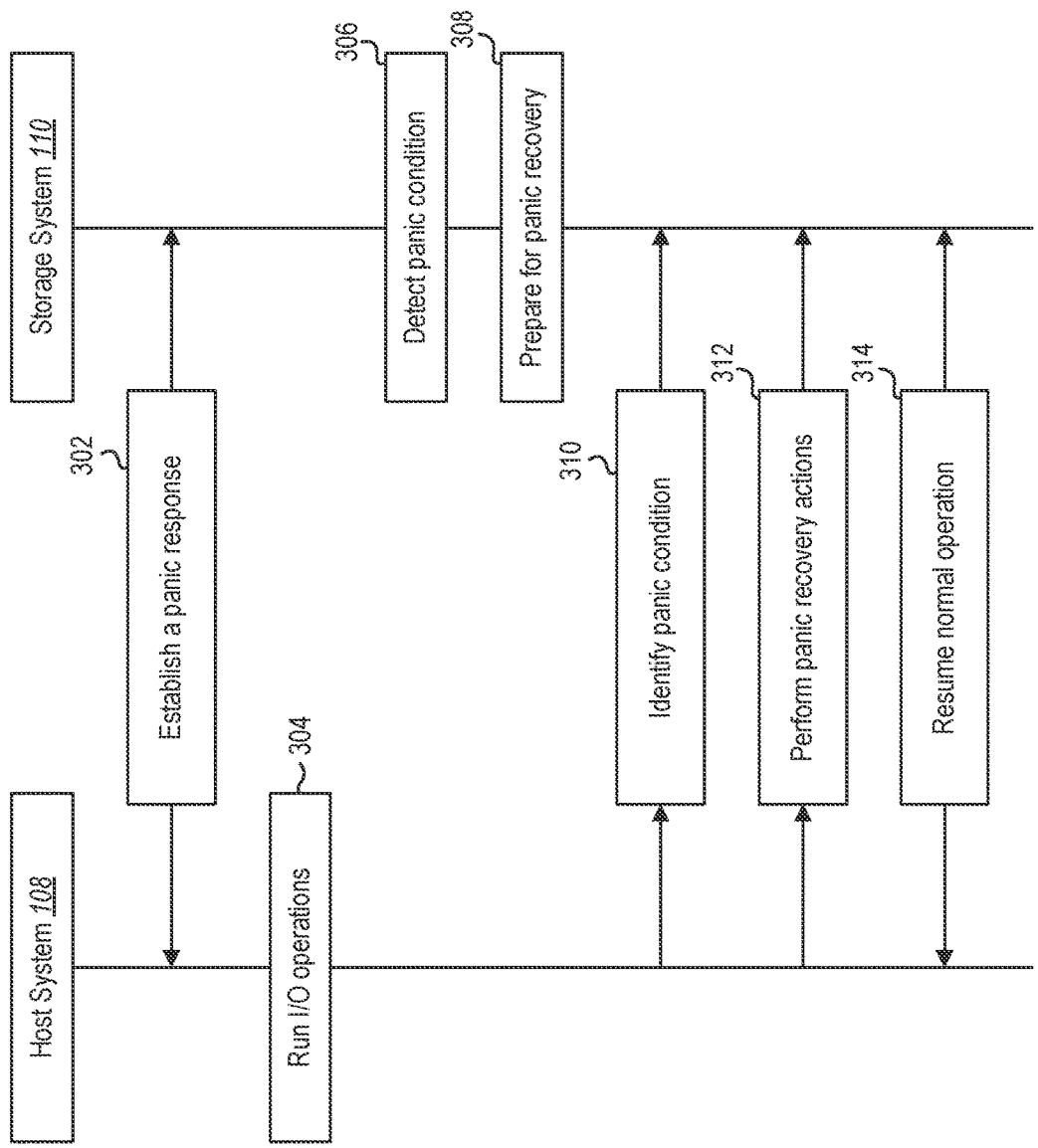
FIG. 3 illustrates an example series of interactions between a host system and a storage system in accordance with one or more embodiments.

Additional detail in connection with specific components 202-224 of the panic management system 106 as well as additional features and functionality of the panic management system 106 will be discussed in connection with a series of interactions between the host system 108 and the storage system 110 in connection with FIG. 3. For example, FIG. 3 illustrates a series of interactions between a host system 108 and storage system 110 including components 202-224 shown above in FIG. 2. FIG. 3 illustrates an example series of acts in a specific order in accordance with one or more embodiments. Nevertheless, additional or fewer acts may be performed, and the acts performed by the host system 108 and/or the storage system 110 may be performed in different orders than shown in FIG. 3 in some implementations.

As shown in FIG. 3, the host system 108 and the storage system 110 may perform an act 302 of establishing a panic response. In particular, at some time prior to experiencing a panic condition (e.g., while performing normal I/O communications or upon first establishing communication between the host system 108 and the storage system 110), the panic setup manager 214 may provide data to enable the host system 108 to respond to an identified panic condition. In one or more embodiments, the host system 108 retrieves log data including recovery instructions associated with the storage system 110.

For example, in one or more embodiments, the panic setup manager 214 can provide data to the host system 108 that enables the host system 108 to identify a panic condition on the storage system 110 (e.g., without receiving a communication specifically identifying the panic condition from the storage system 110). For example, the panic setup manager 214 can provide an indication of a log page to the host system 108 for use in associating the storage system 110 with a corresponding set of recovery instructions. The log page may include instructions to read a panic bit (e.g., a controller fatal status (CFS) bit) that the storage system 110 will set in the event that the storage system 110 experiences a firmware assert or other condition determined to be a panic condition.

As further shown in FIG. 3, the host system 108 can perform an act 304 of running I/O operations with the storage system 110. For example, the I/O manager 202 may interact with the storage system 110 in a variety of ways by issuing any number of I/O commands. During normal operation, the I/O manager 202 can issue any type of command to the storage system 110 including reading and writing to memory or storage of the storage system 110. The I/O manager 202 can additionally issue administrative commands associated with management of the storage system 110. As will be discussed in further detail below, upon experiencing a panic condition, the I/O manager 202 may be limited in the types of I/O commands that the I/O manager 202 is permitted or authorized to issue to the storage system 110.

As further shown in FIG. 3, the storage system 110 can perform an act 306 of detecting a panic condition. In particular, the panic handler 216 on the storage system 110 can detect a panic condition that prevents the storage system 110 from operating in a predictable way or as otherwise designed to operate. For example, the panic handler 216 can detect a firmware assert in which an assert made by the storage system 110 is untrue or an unexpected value and prevents the storage system 110 from proceeding in performing one or more functions.

As shown in FIG. 3, upon detecting the panic condition, the storage system 110 can perform an act 308 of preparing for panic recovery in a variety of ways. For example, in one or more embodiments, an I/O command manager 218 may prevent all I/O communications from the host system 108 until after the panic condition has been resolved. For instance, the I/O command manager 218 may block or prevent any commands from being input or otherwise implemented on the storage system 110. In one or more implementation, the I/O command manager 218 prevents any media access commands including, by way of example, read commands (e.g., NVMe reads), write commands, trim commands, verify commands, and flush commands. In one or more embodiments, the I/O command manager 218 allows administrative commands while preventing any I/O commands (or any commands that would enable the host system 108 from writing or modifying data on the storage system 110).

In one or more embodiments, the I/O command manager 218 may prevent any commands or communications for a wait period or other predetermined duration of time. For example, to prevent the host system 108 from interfering with operations in preparation for panic recovery by the storage system 110, the I/O command manager 218 may provide an indication to the host system 108 to hold off from performing or issuing any I/O commands or other commands (e.g., administrative commands) for a period of time to allow the storage system 110 to perform a series of acts in preparation for panic recovery. For example, the recovery instructions and/or asynchronous event command may include an indication of a period of time (e.g., 6 seconds) that the host system 108 should wait prior to sending any commands or attempting to communicate with the storage system 110. In this way, the I/O command manager 218 can prevent the host system 108 from performing one or more administrative or I/O operations that may interfere with saving a debug log or resetting one or more components of the storage system 110 in preparation for recovering from the panic condition. Additional detail in connection with a wait time and preparing for panic recovery is discussed below.

In addition to blocking or otherwise limiting I/O commands from the host system 108 (e.g., for a determined duration of time), the storage system 110 may additionally set a panic bit to indicate to the host system 108 that a panic condition has occurred. For example, in one or more embodiments described herein, a panic notification manager 220 may set a panic bit (e.g., CFS bit) to an "on" state (e.g., a "1" or a "0") and provide access to the panic bit to the host system 108. The host system 108 may then read the panic bit to determine definitively that the storage system 110 has encountered a panic condition. In this way, the host system 108 need not wait for an extended period of time during which the storage system 110 is not working correctly or perform a more involved diagnostic process in order to determine that the storage system 110 has encountered or otherwise experienced a panic condition.

In one or more embodiments, the storage system 110 may prepare for panic recovery by storing debug log data 224 on the storage data 222 located on or otherwise accessible to the storage system 110. For example, after resetting a CPU component on the storage system 110, the storage system 110 can save debug log data 224 to a non-volatile storage of the storage system 110. As will be discussed in further detail below in connection with FIGS. 4A-4B, storing the debug log data 224 may be performed prior to reestablishing communication and resuming normal operation of the server device 104.

As shown in FIG. 3, the host system 108 may perform an act 310 of identifying a panic condition. For instance, the panic condition identifier 204 on the host system 108 can identify a panic condition in a variety of ways. In one or more embodiments, the panic condition identifier 204 identifies a panic condition by reading the panic bit set by the panic notification manager 220. For example, the panic condition identifier 204 may periodically read the panic bit to determine whether the storage system 110 has set the panic bit to an "on" state.

In one or more embodiments, the panic condition identifier 204 identifies the panic condition based on suspicious activity of the storage system 110 observed by the host system 108. For example, the panic condition identifier 204 can observe that a period of time has passed without receiving a response to an I/O command from the storage system 110. For example, in response to an I/O command, the panic condition identifier 204 can detect that a timer has been running for a threshold number of cycles (e.g., a threshold period of time) or has timed out and determine, based on the period of time that has passed, that the storage system 110 has experienced a panic condition.

In one or more implementations, the panic condition identifier 204 identifies the panic condition based on an asynchronous event notification provided by the storage system 110. For example, the panic notification manager 220 may generate and provide an asynchronous event notification including an identifier of log data 212 (e.g., a log page identifier) that enables the host system 108 to identify a set of recovery instructions associated with the storage system 110. Based on the received asynchronous event notification, the panic condition identifier 204 can determine that a panic condition has occurred. As will be discussed below, the host system 108 may selectively identify recovery instructions based on information included within the asynchronous event notification.

As further shown in FIG. 3, the host system 108 and storage system 110 can perform an act 312 performing one or more panic recovery actions. For example, after giving the storage system 110 a chance to store debug data and perform one or more functions locally, the host system may reestablish communication after waiting the predetermined period of time. As an example, and as will be discussed below in connection with FIG. 4B, the storage communication manager 206 can perform a peripheral component interconnect (PCI) reset (e.g., a PCI express (PCIe) reset). The storage communication manager 206 can additionally initiate logical and physical communication between the host system 108 and storage system 110.

In addition to performing a PCIe reset and other acts for reestablishing communication, the host system 108 and storage system 110 can perform additional panic recovery actions. For example, the panic recovery manager 208 may perform any of a number of recovery actions indicated by the asynchronous event data (e.g., log data 212) exchanged in establishing a panic response. In one or more embodiments, the panic recovery manager 208 identifies recovery actions to be performed based on information received within the received asynchronous event notification. By way of example, the panic recovery manager 208 may perform a variety of panic recovery actions including formatting a non-volatile memory express (NVMe) component, reformatting a manufacturing format, performing vendor-specific analysis, or replacing a drive. Moreover, in one or more implementations, the panic recovery manager 208 simply performs the PCIe reset and reinitializes logical and physical communication in accordance with recovery instructions included within the log data 212.

In one or more embodiments, the host system 108 and storage system 110 may consider a history of recovery actions in identifying and performing various recovery actions. For example, in one or more embodiments, the host system 108 may perform a first set of recovery actions in response to detecting a first instance of a panic condition within a threshold period of time. However, where the host system 108 has identified multiple panic conditions or a certain number of panic conditions within the threshold period of time, the host system 108 may determine that further action is needed beyond a simple PCIe reset and perform one or more different or more invasive recovery actions upon detecting a subsequent panic condition. Further examples of escalating recovery actions will be discussed in connection with FIG. 4B.

As further shown in FIG. 3, the host system 108 and storage system 110 can perform an act 314 of resuming normal operation between the systems 108-110. For example, the host system 108 may continue issuing I/O operations as done prior to identifying the panic condition. In one or more embodiments, the host system 108 and/or storage system 110 provide a report to a vendor to enable the vendor to further investigate why the panic condition occurred and possible steps that may be taken (or additional recovery instructions to add to a log page) in recovering from instances of similar panic conditions.

Figure 4A:
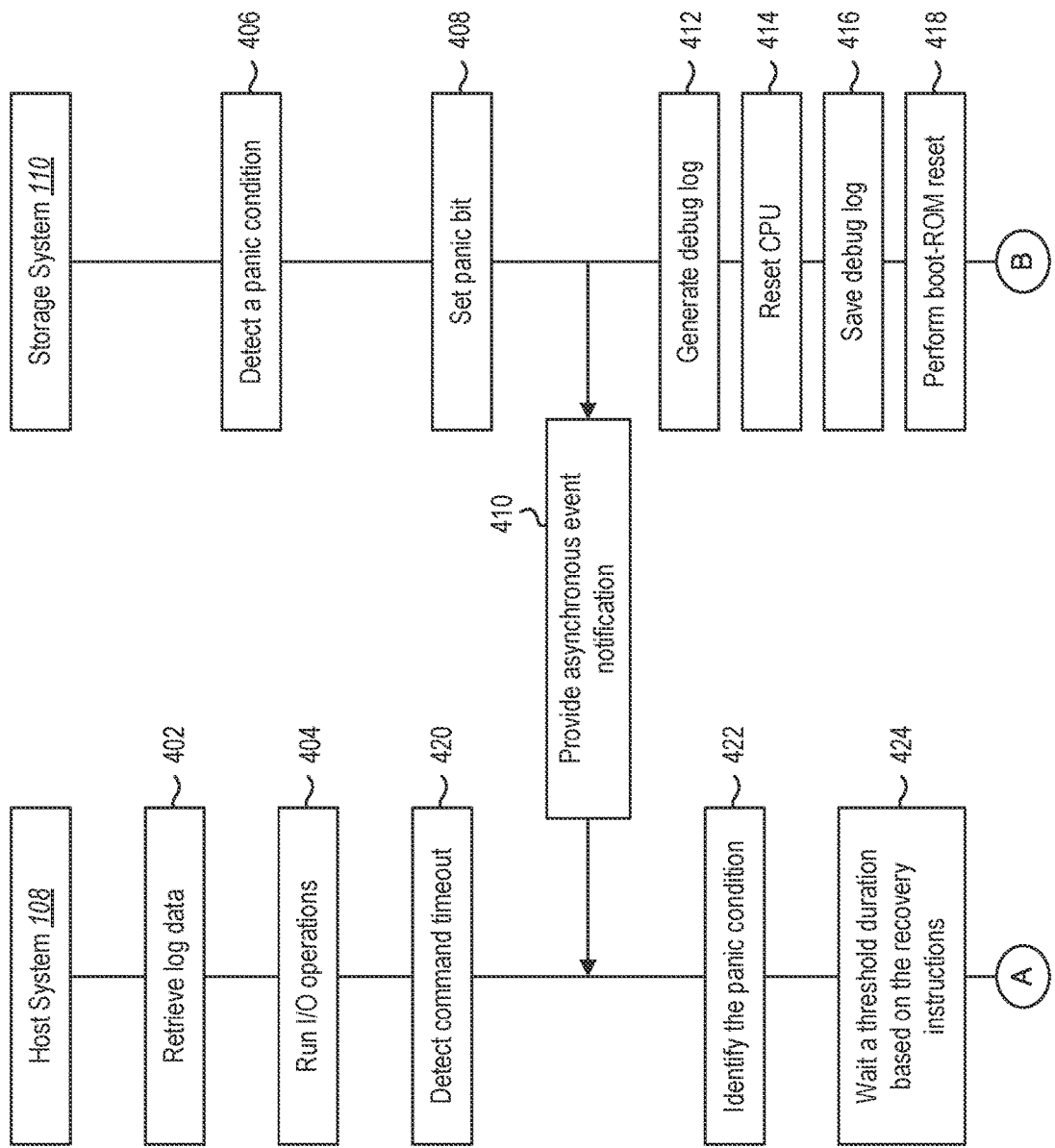
FIG. 4A illustrates an example series of interactions between a host system and a storage system for detecting a panic condition in accordance with one or more embodiments.
Figure 4B:
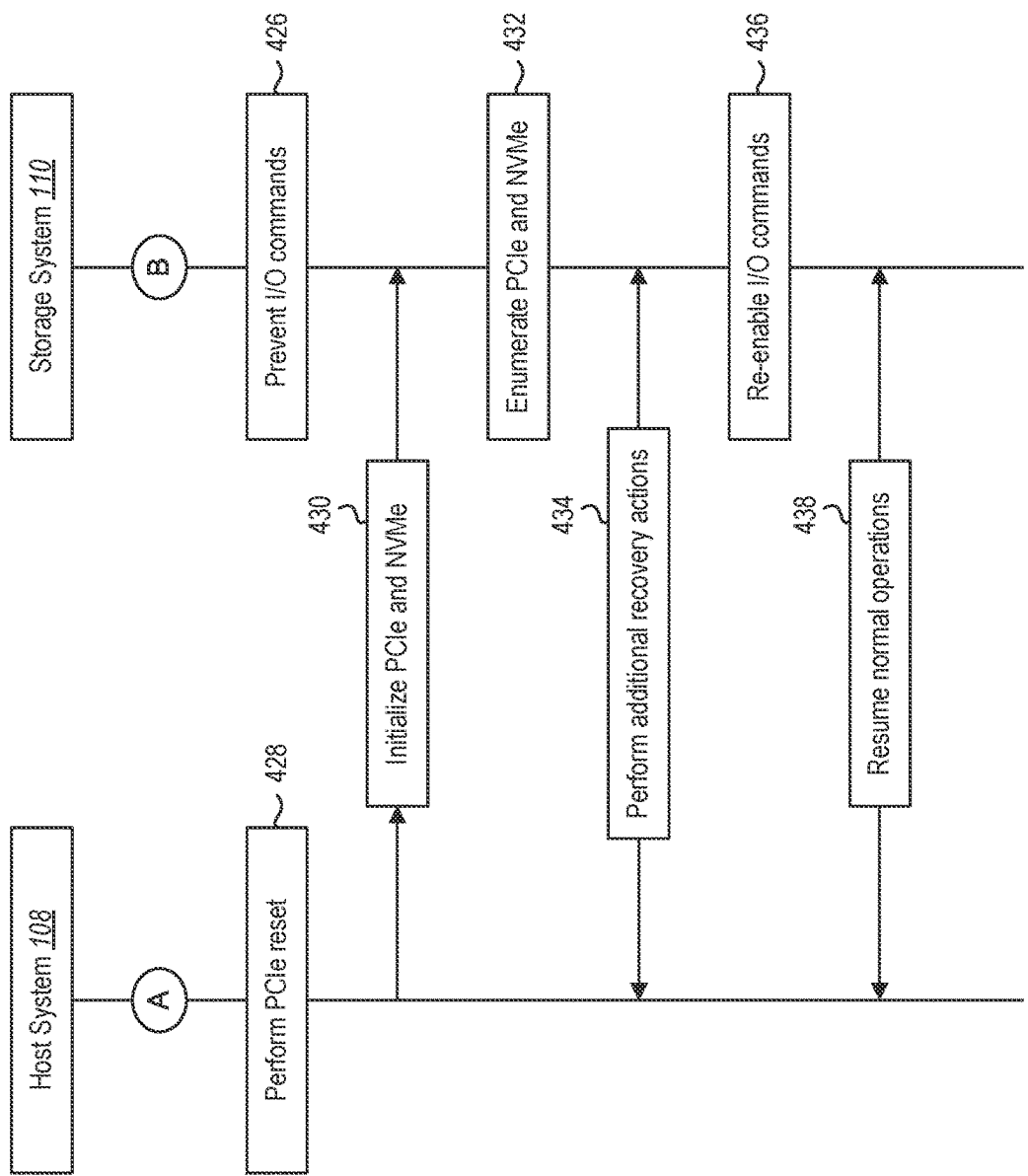
FIG. 4B illustrates an example series of interactions between a host system and a storage system for recovering from a panic condition in accordance with one or more embodiments.

Moving onto FIGS. 4A-4B, these figures illustrate a series of acts that may be performed between the host system 108 and the storage system 110 in accordance with one or more embodiments described herein. In particular, as will be discussed below, the FIG. 4A illustrates an example series of acts that may be performed in connection with identifying a panic condition that has occurred and preparing the storage system for further recovery actions to be performed by the host system 108 and/or storage system 110. In addition, FIG. 4B illustrates an example series of acts that may be performed in connection with recovering from the identified panic condition in a manner that enables the host system 108 and storage system 110 to resume normal operation. The series of acts shown in FIGS. 4A-4B are provided by way of example and are not intended to be limited to a specific order. In addition, one or more embodiments described herein may omit or add one or more acts to the example series of acts shown in FIGS. 4A-4B.

As shown in FIG. 4A, the host system 108 may perform an act 402 of retrieving log data. For example, upon startup of the host system 108, the system driver may access a log page including recovery instructions associated with recovering from a panic condition on the storage system 110. The host system 108 can access and store the log page data at any point prior to identifying a panic condition.

The recovery instructions may include any information that enables the host system 108 to understand how to identify a panic condition as well as how to best respond to the identified panic condition. For example, the recovery instructions may include an identification of a period of time that the host system 108 should wait upon identifying a panic condition prior to issuing any I/O commands and/or limiting the host system 108 from performing various recovery actions in order to allow the storage system 110 to adequately prepare for panic recovery. The recovery instructions may further include instructions associated with specific recovery actions to perform under different circumstances or in view of specifications or hardware specifics of the storage system 110. The recovery instructions may be relied upon by the host system 108 in performing additional acts discussed below.

As further shown in FIG. 4A, a host system 108 may perform an act 404 of running I/O operations. The host system 108 may issue any number and variety of I/O commands to the storage system 110 in accordance with normal operation of a server device on which the host system 108 and storage system 110 are implemented. For example, the host system 108 may issue I/O commands to write or modify data on the storage system 110. The host system 108 can issue administrative commands that modify how the storage system 110 operates.

As shown in FIG. 4A, the storage system 110 may perform a series of acts 406-418 while the host system 108 performs a series of acts 420-424. The acts performed by the respective systems 108-110 may be performed in the order shown on FIG. 4A or asynchronously by the host system 108 and the storage system 110, respectively.

To illustrate, as shown in FIG. 4A, the storage system 110 can perform an act 406 of detecting a panic condition. As indicated above, the storage system 110 may detect a panic condition in a variety of ways. In one or more embodiments, the storage system 110 may detect a firmware assert by detecting an assertion by the storage system 110 that is untrue (or other unexpected value). Alternatively, the storage system 110 may detect that one or more components of the storage system 110 are behaving suspiciously and determine that a panic condition applies.

Upon detecting the panic condition, the storage system 110 may perform an act 408 of setting a panic bit. As indicated above, the storage system 110 may set a panic bit (e.g., a CFS bit) to an "on" state as an indicator to the host system 108 that the storage system 110 is not operating correctly and that the host system 108 should draw upon log data previously obtained by the host system 108 to determine how to best respond to the detected panic condition. For instance, the panic bit may serve as an indicator for the host system 108 to wait a certain period of time (e.g., 6 seconds) prior to attempting communication or otherwise issuing any commands to the storage system 110.

In addition, or as an alternative to setting the panic bit, the storage system 110 may perform an act 410 of providing an asynchronous event notification to the host system 108. For example, upon detecting the panic condition, the storage system 110 may generate and provide an asynchronous event notification to notify the host system 108 that a panic condition has occurred on the storage system 110. The asynchronous event notification may include information to enable the host system 108 to determine how to best respond to the panic condition. For example, the asynchronous event notification may include an identifier of a log page that provides recovery instructions to the host system 108. In one or more implementations, the asynchronous event notification includes an indicated wait time instructing the host system 108 to wait a predetermined period of time to enable the storage system 110 to perform one or more acts in preparation for the host system 108 to perform one or more panic recovery actions.

FIG. 4A illustrates an example in which the storage system 110 both sets a panic bit and provides the asynchronous event notification to the host system 108. Nevertheless, one or more implementations described herein may include performing only one of acts 408 and 410 as a technique for informing the host system 108 that a panic condition has occurred. For example, where the storage system 110 is configured and able to generate and provide the asynchronous event notification in response to detecting a panic condition is encountered, the storage system 110 may only provide the asynchronous event notification rather than setting the panic bit. Alternatively, the storage system 110 may set the panic bit as an alternative to delivering the asynchronous event notification where the storage system 110 is unable to generate and provide the asynchronous event notification under various panic conditions. Nevertheless, in one or more implementations, the storage system 110 may perform both of acts 408 and 410 to ensure that the host system 108 is alerted to the panic condition of the storage system 110.

After detecting the panic condition and setting the panic bit to an "on" state (and/or delivering the asynchronous event notification), the storage system 110 can perform an act 412 of generating a debug log. For example, the storage system 110 can generate a debug log including any information about the panic condition such as a state of memory, storage, and/or a state of the storage system 110 at a time when the panic condition was detected. This debug log may initially be generated on a volatile portion of the storage system 110 (e.g., the CPU, SRAM, DRAM).

After generating the debug log, the storage system 110 can perform an act 414 of resetting a CPU (e.g., perform a warm reset). In particular, the storage system 110 can reset a CPU component of the storage hardware of the storage system 110. For example, where the storage system 110 includes an SSD storage device including a CPU, a volatile portion of storage (e.g., dynamic random-access memory (DRAM) and static random-access memory (SRAM), and a volatile portion of storage (e.g., NAND storage, flash storage), the storage system 110 may reset the CPU and clean out a current state of the CPU component. In resetting the CPU, data on other components (e.g., SRAM, DRAM) of the storage system 110 may remain intact. By resetting the CPU, the storage system 110 may allow for certain functions of the storage system 110 to be restored without losing the debug data.

As shown in FIG. 4A, the storage system 110 may perform an act 416 of saving the debug log. In particular, after resetting the CPU, the storage system 110 may cause the debug log to be flushed and stored to non-volatile storage (e.g., NAND storage) on the storage system 110. This debug log may be stored on the non-volatile storage for later access (e.g., by the host system 108, vendor, or other entity).

After saving the debug log, the storage system 110 can perform an act 418 of performing a boot-rom reset (e.g., perform a cold reset). Performing a boot-rom reset may include powering down and powering up additional components of the storage system 110 such as the DRAM, SRAM, the CPU, and/or any additional volatile memory components of the storage system 110. For example, in contrast to performing a warm reset discussed above that involves resetting the CPU (e.g., without resetting additional volatile memory components), performing the boot-rom reset may involve resetting each component of the storage system to clear all data from each component other than the non-volatile storage. As an illustrative example, where the storage system 110 refers to an SSD storage including a CPU, DRAM, SRAM, and NAND storage, performing a boot-rom reset may involve powering down and powering up each of the components to clear temporary data from the CPU, DRAM, and SRAM without clearing the data maintained on the NAND storage. Performing the boot-rom reset may additionally include reinitializing hardware and firmware of the storage system 110. This may be initiated internally by a driver and without receiving any instructions from the host system 108.

As mentioned above and as shown in FIG. 4A, prior to or concurrent with performing the acts 406-418 discussed above, the host system 108 can additionally perform acts 420-424 discussed herein. For example, the host system 108 can perform an act 420 of detecting a command timeout. For example, in one or more embodiments, the host system 108 includes a command timer. The command timer may indicate a time between when an I/O command is provided to the storage system 110 and when a response to the I/O command is received or registered by the host system 108. In one or more implementations described herein, the host system 108 may determine that the storage system 110 is behaving suspiciously based on the command timer indicating that a threshold period of time has passed without a response from the storage system 110. In one or more embodiments, the detected timeout serves as an indication to check a value of the panic bit (e.g., in one or more embodiments where the asynchronous event notification is not provided to the host system 108).

The host system 108 may additionally perform an act 422 of identifying a panic condition. As indicated above, the host system 108 can identify a panic condition in a number of ways. For example, the host system 108 may determine that a panic condition has occurred based on the command timer timing out. In one or more embodiments, the host system 108 determines that a panic condition has occurred by reading the panic bit to discover that the storage system 110 has set the panic bit to an "on" state. The host system 108 may check the panic bit periodically (e.g., every few seconds) and/or upon detecting the command timeout.

In addition, or as an alternative to identifying the panic condition based on detecting suspicious activity and/or reading the panic bit, the host system 108 may identify the panic condition based on receiving the asynchronous event notification. For example, as shown in FIG. 4A, the host system 108 can receive the asynchronous event notification generated by and provided by the storage system 110. As mentioned above, the asynchronous event notification may include an identification of a log page to enable the host system 108 to identify recovery instructions associated with the storage system 110.

As further shown in FIG. 4A, the host system 108 may perform an act 424 of waiting a threshold duration of time based on the recovery instructions (e.g., from the log page(s)). For example, the host system 108 may wait for a period of time (e.g., 6 seconds) to allow the storage system 110 to prepare for recovery and/or for receiving any commands from the host system 108. For instance, based on an estimate period of time that it takes to perform acts 408-418 in response to detecting the panic condition, the host system 108 may wait a similar duration of time before attempting to reinitiate communication with the storage system 110, as will be discussed in further detail below. By waiting a short period of time in accordance with received instructions, the host system 108 can avoid interfering with data on the storage system 110 (e.g., debug data) and inadvertently prevent the storage system 110 from storing the debut data on the non-volatile storage. In addition, this allows the storage system 110 to reinitialize firmware and hardware (e.g., by performing the CPU reset and the boot-rom), thus giving the storage system 110 a better chance at recovering from the panic condition when the host system 108 attempts to perform one or more additional recovery actions.

In one or more embodiments, the host system 108 performs acts 420-424 in accordance with instructions contained within a log page or other log data indicted by the asynchronous event notification. For example, the host system 108 may detect the timeout in accordance with instructions from log data indicating that a timeout condition is indicative of the storage system 110 experiencing a given panic condition. The host system 108 may further read the panic bit based on the instructions from the log data. In one or more implementations, the host system 108 determines a period of time to wait before attempting to re-establish communication or issuing any commands to the storage system 110 based on instructions from the log data.

Moving onto FIG. 4B, the storage system 108 can perform an act 426 of preventing I/O commands. For example, the storage system 110 can prevent the storage system 110 from receiving or responding to any commands received from the host system 108. In one or more embodiments, the storage system 110 prevents receipt or response to any I/O commands while still allowing the storage system 110 to receive and/or respond to administrative commands. The storage system 110 may prevent I/O commands for a period of time corresponding to the predetermined period of time that the host 108 is supposed to wait prior to attempting to reestablish communication with the storage system 110 (e.g., in connection with act 424).

As further shown in FIG. 4B, the host system 108 can perform an act 428 of performing a PCIe reset. For example, rather than performing an invasive power cycle, the host system 108 can instead perform a PCIe reset to reinitialize an interface for enabling physical communication from the host system 108. Similarly, the host system 108 may perform an act 430 of initializing PCIe and NVMe on the storage system 110 (e.g., after waiting the predetermined period of time discussed above).

In one or more embodiments, initializing the PCIe and the NVMe involves setting PCIe registers based on system configurations and triggering a signal interrupt. The host system 108 may wait for a controller to indicate that any previous reset is completed. The host system 108 may further configure an administrative queue and controller settings. The host system 108 may wait for a controller to indicate a readiness for the controller and/or storage system 110 to process commands.

In one or more embodiments, initializing the PCIe and the NVMe further involves the host system 108 issuing an identify command to determine a configuration of the controller. The host system 108 may further determine the configuration of each namespace by issuing the identify command for each namespace. The host system 108 may further issue a set features command with a number of queues feature identifier to determine a number of I/O submission queues and completion queues. The host system 108 may further indicate an asynchronous notification of events to enable. The host system 108 may additionally issue a create I/O completion queue command to allocate an appropriate number of I/O completion queues. The host system 108 may further issue a create I/O submission queue command to allocate an appropriate number of I/O submission queues.

Upon initializing the PCIe and the NVMe, the storage system 110 can perform an act 432 of enumerating PCIe and NVMe on the storage system 110. For example, the storage system 110 can perform PCIe enumeration by assigning a PCIe bus number to each PCIe link and a point-to-point (P2P) bridge connection. The storage system 110 can further fill up a secondary bus number and subordinate bus number inside each P2P bridge so that software running in a CPU on the storage system 110 can uniquely identify each PCIe device and P2P bridges in combination. In this way, transactions can be routed to correct target PCIe devices. This process of initializing and enumerating the PCIe and the NVMe may enable the host system 108 and storage system 110 to re-establish communication.

By performing the PCIe reset, initializing the PCIe and the NVMe, and enumerating the PCIe and the NVMe on the storage system, the host system 108 and storage system 110 can enable a driver (e.g., on the host system 108) to communicate with the storage system 110. For example, upon initializing the PCIe and the NVMe, the host system 108 can begin communicating with the storage system 110 to issue one or more administrative commands and/or certain I/O commands.

In one or more embodiments, the host system 108 performs 434 one or more additional recovery actions. For example, where resetting the CPU, performing the boot-rom reset, performing the PCIe reset, and initializing the PCIe and the NVMe has not resolved the panic condition, or where the asynchronous event notification points to log data that includes additional recovery instructions, the host system 108 can perform one or more additional recovery actions.

As mentioned above, the host system 108 and/or storage system 110 can perform additional recovery actions such as power cycling the systems 108-110, reformatting the NVMe of the storage system 110, performing a manufacturing format, or other more invasive actions. In one or more embodiments, the host system 108 may determine that the panic condition cannot be resolved by an automated solution and that vendor analysis is required. In some cases, the host system 108 may determine that the panic condition is fatal to the hardware or otherwise lacks a known solution for recovering from the panic condition and that replacement of the hardware is necessary.

In one or more embodiments, the host system 108 identifies additional recovery actions to perform based on the recovery instructions (e.g., from the indicated log page). For instance, a panic identifier may point to a log page that includes any number of recovery actions to perform for a given storage system 110. Alternatively, however, where the host system 108 does not receive an asynchronous event notification or where a log page associated with the storage system 110 does not include specific information for how to recover from the panic condition, the host system 108 and the storage system 110 may perform some or all of the acts discussed above in connection with resetting components of the storage system 110, resetting and initializing the PCIe and NVMe, and then re-establish communication between the host system 108 and storage system 110.

Assuming the device panic condition has been fixed, the host system 108 and storage system 110 will continue operating correctly. However, if the panic condition has yet to be resolved, the host system 108 may again identify a panic condition and iterate through the steps discussed above to save the debug log and determine how to best respond to the panic condition. In this example, the host system 108 may determine that simply repeating the same process over and over will not resolve the panic condition and perform a more invasive solution (e.g., power cycling and/or reporting to a vendor). For example, in one or more implementations, the storage system 110 may track a number of times that panic recovery has happened and maintain a count of the panic condition instances on the storage of the storage system 110. Thus, in one or more embodiments, the host system 108 may identify additional recovery instructions (e.g., from the log page) where different recovery actions are identified based on a number of panic instances that have been detected by the storage system 110.

In one or more embodiments, the host system 108 reports the panic condition. The host system 108 can report the panic condition in a variety of ways. For instance, the host system 108 can report the health of the storage system 110 via the updated log data (e.g., through NVMe or a log page) or an internal driver log. This may include simply storing the log data or internal driver log for access at some future time. In one or more embodiments, the host system 108 causes the server device(s) 104 to transmit or otherwise provide a panic report to a vendor for analysis in determining what panic conditions are happening and how best to service other devices on the cloud computing system 102.

As shown in FIG. 4B, the storage system 110 may perform an act 436 of reenabling I/O commands. This may be done upon enumerating the PCIe and the NVMe. In one or more embodiments, the storage system 110 waits until any additional recovery actions (if any) are performed. As shown in FIG. 4B, once communication has been reestablished between the host system 108 and the storage system 110 and the storage system 110 has re-enabled I/O commands, the host system 108 and the storage system 110 may perform an act 438 of resuming normal operations. 0

Figure 5:
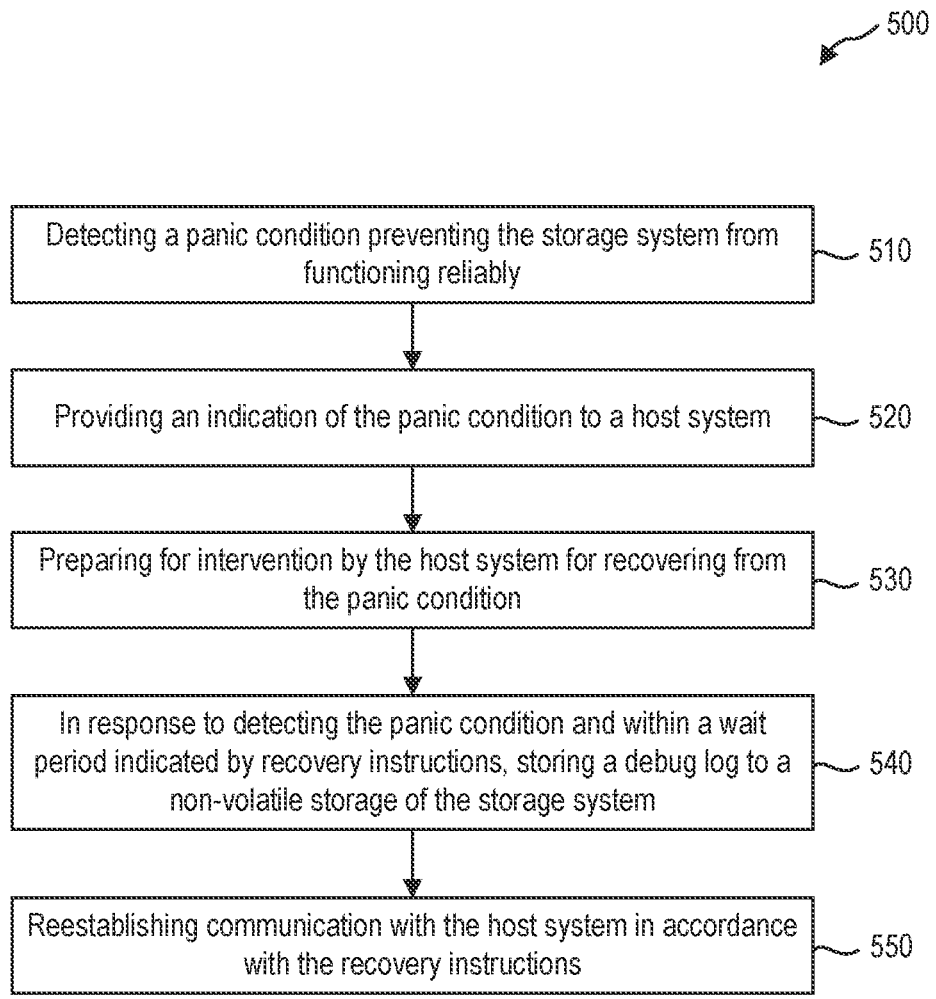
FIG. 5 illustrates an example series of acts that may be performed by a storage system for detecting and recovering from a panic condition in accordance with one or more embodiments.
Figure 6:
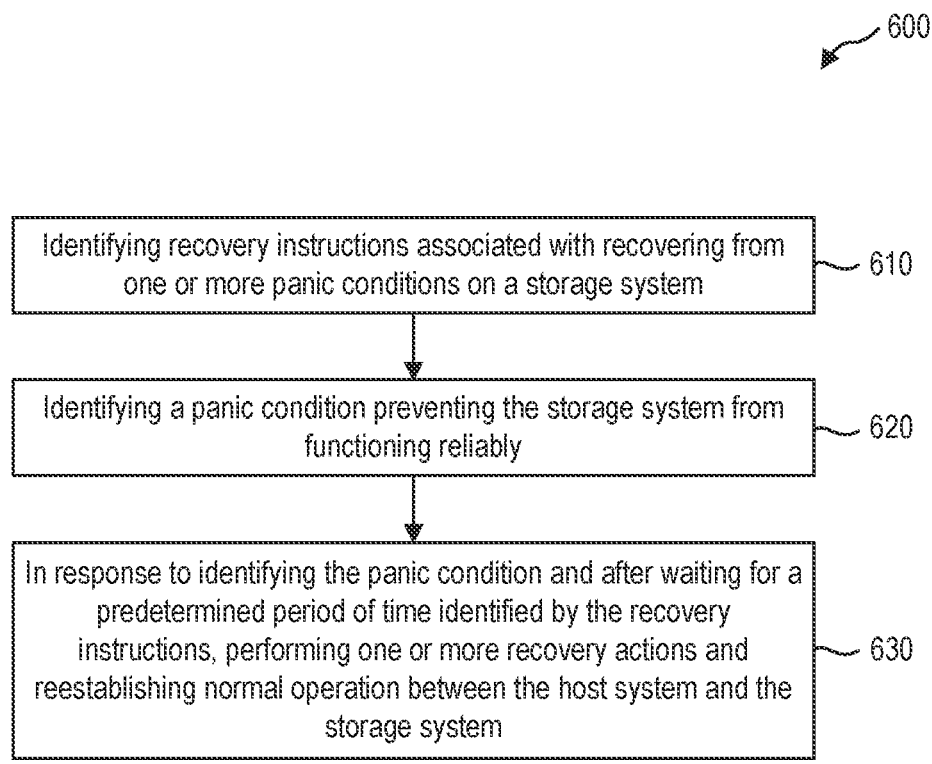
FIG. 6 illustrates an example series of acts that may be performed by a host system for detecting and recovering from a panic condition in accordance with one or more embodiments.

Turning now to FIGS. 5-6, these figures illustrates example flowcharts including series of acts for detecting and recovering from a panic condition in accordance with one or more embodiments described herein. While FIGS. 5-6 illustrate acts according to one or more embodiments, alternative embodiments may omit, add to, reorder, and/or modify any of the acts shown in FIGS. 5-6. The acts of FIGS. 5-6 can be performed as part of a method. Alternatively, a non-transitory computer-readable medium can include instructions that, when executed by one or more processors, cause a computing device to perform the acts of FIGS. 5-6. In still further embodiments, a system can perform the acts of FIGS. 5-6.

FIG. 5 illustrates a series of acts 500 that may be performed by a storage system in accordance with one or more embodiments described herein. For example, the series of acts 500 may include an act 510 of detecting a panic condition preventing the storage system from functioning reliably. In one or more embodiments, the act 510 involves detecting, by a storage system, a panic condition preventing the storage system from functioning reliably. In one or more embodiments, the storage system includes a solid-state drive (SSD) storage device. In addition, in one or more implementations, the panic condition includes a firmware assert of the SSD storage device.

As further shown, the series of acts 500 may include an act 520 of providing an indication of the panic condition to a host system. In one or more embodiments, providing the indication of the panic condition includes providing, to the host system, an asynchronous event notification including an indication that the panic condition has occurred on the storage system. In one or more embodiments, the asynchronous event notification includes an identification of a log page accessible to the host system where the log page has executable instructions associated with performing panic recovery. In one or more implementations, the storage system includes a solid-state drive (SSD) storage device associated with a vendor. In addition, the log page may include instructions executable by the host system that are unique to the SSD storage device associated with the vendor.

In one or more embodiments, providing the indication of the panic condition includes setting a panic bit to an on state to indicate the detected panic condition to the host system, wherein the panic bit is readable by the host system. For example, in one or more embodiments, the storage system sets a CFS bit upon detecting the panic condition.

As further shown, the series of acts 500 may include an act 530 of preparing for intervention by a host system for recovering from the panic condition. For example, the act 530 may involve preparing for intervention by a host system for recovering from the panic condition where preparing for intervention by the host system includes preventing the host system from performing one or more recovery actions for a predetermined period of time in accordance with recovery instructions accessible to the host system.

In one or more embodiments, preparing for intervention by the host system includes disabling, in response to detecting the panic condition and for the predetermined period of time, input/output (I/O) commands from the host system. In one or more implementations, the series of acts 500 includes enabling one or more administrative commands from the host system while disabling the I/O commands.

As further shown, the series of acts 500 may include an act 540 of, in response to detecting the panic condition and within a wait period indicated by recovery instructions, storing a debug log to a non-volatile storage of the storage system. For example, the act 540 may involve storing, by the storage system in response to detecting the panic condition and within the predetermined period of time, a debug log to a non-volatile storage of the storage system.

In one or more embodiments, the series of acts 500 includes resetting a central processing unit (CPU) of the storage system prior to storing the debug log on the non-volatile storage of the storage system. In addition, the series of acts 500 may include performing a boot rom reset of the storage system after storing the debug log on the non-volatile storage of the storage system.

Furthermore, the series of acts 500 may include an act 550 of reestablishing communication with the host system in accordance with the recovery instructions. For example, the act 550 may involve reestablishing communication with the host system in accordance with the recovery instructions and resuming normal operation of a computing node on which the storage system and/or host system are implemented.

FIG. 6 illustrates a series of acts 600 that may be performed by a host system. As shown in FIG. 6, the series of acts 600 may include performing an act 610 of identifying recovery instructions associated with recovering from one or more panic conditions on a storage system. For example, the act 610 may involve identifying recovery instructions associated with recovering from one or more panic conditions on a storage system where the recovery instructions include an identified duration of time associated with enabling the storage system to prepare for panic recovery.

As further shown, the series of acts 600 may include an act 620 of identifying a panic condition preventing the storage system from functioning reliably. For example, in one or more embodiments, identifying a panic condition may involve detecting or otherwise identifying a firmware assert on the storage system.

In one or more embodiments, identifying the recovery instructions includes obtaining a log page having instructions for performing panic recovery on the storage system. In addition, identifying the panic condition may include reading a panic bit set by the storage system in response to the storage system detecting the panic condition. The series of acts 600 may further include determining that a command timer has timed out based on a delay in receiving a response to an input/output (I/O) command provided to the storage system. The host system may read the panic bit set by the storage system in response to determining that the command timer has timed out. In addition, or as an alternative to setting the panic bit, identifying the panic condition may involve receiving an asynchronous event notification including an identifier of the log page having the instructions for performing panic recovery on the storage system.

The series of acts 600 may additionally include an act 630 of, in response to identifying the panic condition and after waiting for a predetermined period of time identified by the recovery instructions, performing one or more recovery actions and reestablishing normal operation between the host system and the storage system. For example, the act 630 may include performing, based on identifying the panic condition and after the identified duration of time has passed, one or more recovery actions and reestablishing normal operation between the host system and the storage system.

In one or more embodiments, performing the one or more recovery actions includes logging an instance of the panic condition. The one or more recovery actions may additionally include formatting a non-volatile memory (NVM) of the storage system. In one or more embodiments, performing one or more panic recovery actions includes providing a notice to a vendor for further analysis of the panic condition.

In one or more embodiments, performing one or more recovery actions includes performing a peripheral component interconnect express (PCIe) reset on the host system. After performing the PCIe reset on the host system, performing one or more recovery actions may also include reinitializing logical and physical communication between the host system and the storage system in accordance with the recovery instructions. In one or more embodiments, the series of acts 600 includes updating a log history to include the identified panic condition and performing the one or more recovery actions where performing the one or more recovery actions is based on the updated log history including a plurality of instances of the identified panic condition.

Figure 7:
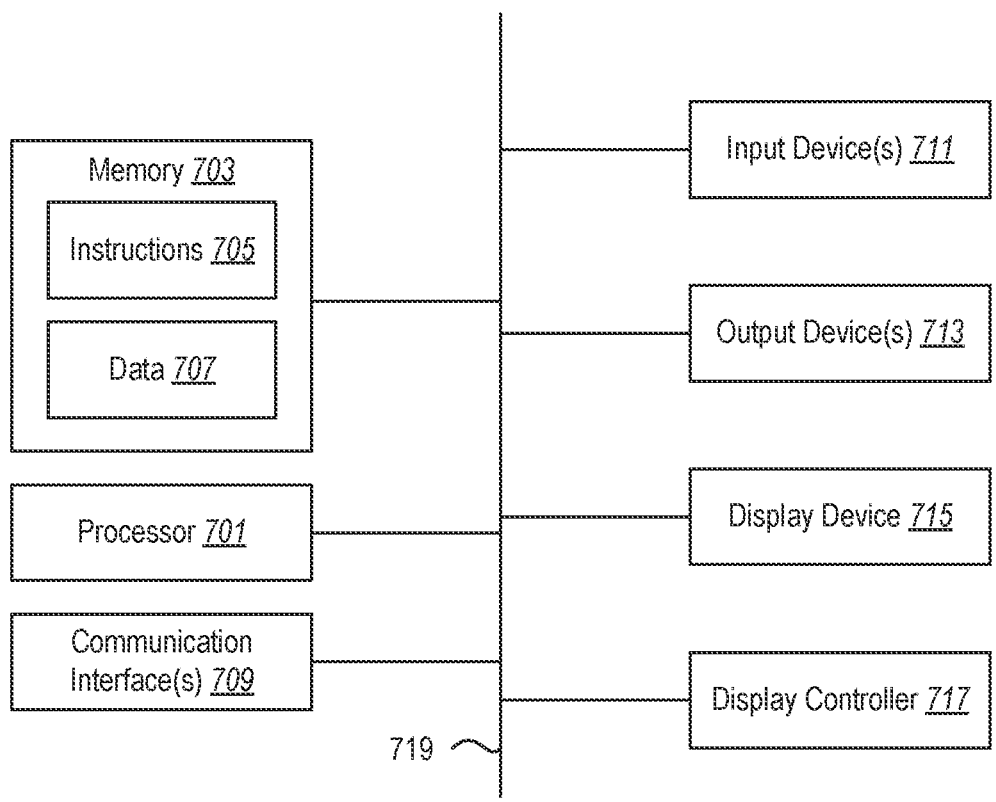
FIG. 7 illustrates certain components that may be included within a computer system.

FIG. 7 illustrates certain components that may be included within a computer system 700. One or more computer systems 700 may be used to implement the various devices, components, and systems described herein.

The computer system 700 includes a processor 701. The processor 701 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. In a computing environment including a processor device in communication with storage hardware, a method performed by the storage hardware, the method comprising:
   detecting, by the storage hardware, a panic condition preventing the storage hardware from functioning as configured;
   setting a panic bit to an on state to indicate the panic condition to the processor device, wherein the on state of the panic bit is readable by the processor device;
   preparing for intervention by the processor device by preventing the processor device from performing a recovery action on the storage hardware; and
   reestablishing communication between the storage hardware and the processor device after preparing for the intervention by the processor device.

2. The method of claim 1, further comprising providing, to the processor device, an asynchronous event notification including an indication that the panic condition has occurred on the storage hardware.

3. The method of claim 2, wherein the asynchronous event notification includes an identification of a log page accessible to the processor device, the log page including executable instructions associated with recovering from the panic condition.

4. The method of claim 1, wherein the storage hardware includes a solid-state drive (SSD) storage device associated with a vendor.

5. The method of claim 4, wherein reestablishing communication between the storage hardware and the processor device is performed based on recovery instructions executable by the processor device that are unique to the SSD storage device associated with the vendor.

6. The method of claim 1, wherein preparing for intervention by the processor device comprises disabling, in response to detecting the panic condition, input/output (I/O) commands from the processor device to the storage hardware.

7. The method of claim 6, further comprising enabling an administrative command from the processor device while the I/O commands from the processor device are disabled.

8. The method of claim 7, wherein reestablishing communication with the processor device includes enabling I/O commands from the processor device to the storage hardware.

9. The method of claim 1, wherein the storage hardware includes a solid-state drive (SSD) storage device, and wherein the panic condition comprises a firmware assert of the SSD storage device.

10. The method of claim 1, further comprising, prior to detecting the panic condition, providing recovery instructions to the processor device, the recovery instructions including executable instructions associated with waiting at least a predetermined period of time prior to performing the recovery action on the storage hardware.

11. The method of claim 1, further comprising storing, by the storage hardware, a debug log to a non-volatile storage of the storage hardware.

12. In a computing environment including a processor device in communication with storage hardware, a method performed by the processor device, the method comprising:
- identifying recovery instructions including log pages associated with recovering from one or more panic conditions detected on the storage hardware, the recovery instructions including executable instructions associated with enabling the storage hardware to prepare for panic recovery;
- identifying, by a processor device, a panic condition preventing the storage hardware from functioning as configured; and
- performing, based on identifying the panic condition, one or more recovery actions from a log page of the recovery instructions and reestablishing normal operation between the processor device and the storage hardware.

13. The method of claim 12, wherein identifying the panic condition is based on receiving an asynchronous event notification from the storage hardware indicating a log page from the recovery instructions.

14. The method of claim 12, wherein identifying the panic condition comprises receiving an asynchronous event notification including an identifier of a log page that includes instructions for performing panic recovery on the storage hardware.

15. The method of claim 12, further comprising determining that a command timer has timed out based on a delay in receiving a response to an input/output (I/O) command provided to the storage hardware, and wherein the processor device reads a panic bit set by the storage hardware in response to determining that the command timer has timed out.

16. The method of claim 12, wherein performing the recovery action comprises:
- logging an instance of the panic condition;
- formatting a non-volatile memory (NVM) of the storage hardware; or
- providing a notice to a vendor for further analysis of the panic condition.

17. The method of claim 12, wherein performing the recovery action comprises:
- performing a peripheral component interconnect express (PCIe) reset on the processor device; and
- after performing the PCIe reset on the processor device, reinitializing logical and physical communication between the processor device and the storage hardware in accordance with the recovery instructions.

18. The method of claim 12, further comprising updating a log history to include the panic condition and performing the recovery action, wherein performing the recovery action is based on the updated log history including a plurality of instances of the panic condition.

19. A system, comprising:
- at least one processor device; and
- a storage hardware including at least one solid state drive (SSD) storage device, the storage hardware being configured to:
  - detect a panic condition preventing the storage hardware from functioning as configured;
  - set a panic bit to an on state to indicate the panic condition to the at least one processor device, wherein the on state of the panic bit is readable by the at least one processor device;
  - prepare for intervention by the at least one processor device by preventing the at least one processor device from performing a recovery action on the storage hardware; and
  - reestablish communication between the storage hardware and the at least one processor device after preparing for the intervention by the processor device.

20. The system of claim 19, wherein preparing for intervention by the at least one processor device comprises:
- disabling, in response to detecting the panic condition, input/output (I/O) commands from the at least one processor device; and
- enabling an administrative command from the at least one processor device while the I/O commands from the at least one processor device are disabled.

* * * * *